United States Patent [19]

Yoshimura

[11] Patent Number: 5,032,851
[45] Date of Patent: Jul. 16, 1991

[54] METHOD OF PRINTING PRINTED MATTERS

[75] Inventor: Hisashi Yoshimura, Nara, Japan

[73] Assignee: Sharp Kabushiki Kaisha, Osaka, Japan

[21] Appl. No.: 512,018

[22] Filed: Apr. 16, 1990

Related U.S. Application Data

[63] Continuation of Ser. No. 875,736, Jun. 18, 1986, abandoned.

[30] Foreign Application Priority Data

Jun. 21, 1985 [JP] Japan .................................. 60-136337
Jun. 21, 1985 [JP] Japan .................................. 60-136338

[51] Int. Cl.⁵ .......................... B41J 2/205; B41J 2/21
[52] U.S. Cl. ................................ 346/140 R; 358/298
[58] Field of Search .................... 346/1.1, 140, 75; 358/298

[56] References Cited

U.S. PATENT DOCUMENTS

| | | | |
|---|---|---|---|
| 3,947,851 | 3/1976 | Chen | 346/1.1 |
| 4,353,079 | 10/1982 | Kawanabe | 346/140 |
| 4,503,444 | 3/1985 | Tacklind | 346/140 |
| 4,513,299 | 4/1985 | Lee | 346/140 |
| 4,516,139 | 7/1985 | Takiguchi | 346/140 |
| 4,620,196 | 10/1986 | Hertz | 346/1.1 |
| 4,631,548 | 12/1986 | Milbrant | 346/140 X |

*Primary Examiner*—Joseph W. Hartary

[57] ABSTRACT

An ink jet printer for printing colored printed matter on printing paper, in which amounts of ink per one dot for each of a single color representation and mixed color representation are adapted to be equal to each other so as to provide dots of generally the same size for both representations, thus presenting very beautiful color printing through natural combinations of the single color and mixed color.

1 Claim, 10 Drawing Sheets

PRIOR ART

PRIOR ART

PRIOR ART

PRIOR ART

METHOD OF PRINTING PRINTED MATTERS

This application is a continuation, of application Ser. No. 6/875,736 filed on June 18, 1986.

BACKGROUND OF THE INVENTION

The present invention generally relates to a method of printing printed material through employment of an ink-jet printing apparatus and more particularly, to a method of representing gradation in printed matter.

Figures 11A, 11B:
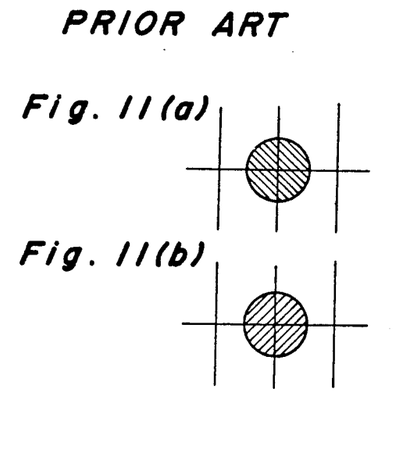
FIGS. 11(a) and 11(b) are diagrams respectively for explaining the adhering position of ink drops and size of a dot during the single color representation according to the conventional printing method (already referred to)
Figures 12A, 12B:
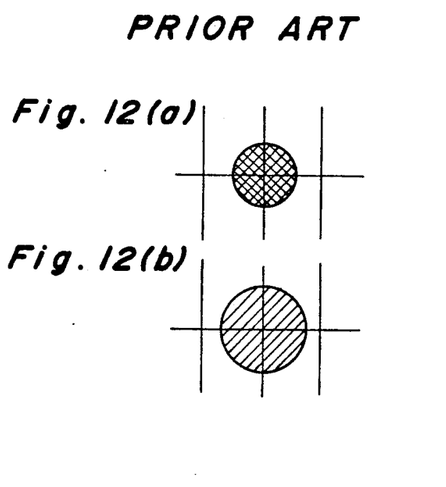
FIGS. 12(a) and 12(b) are diagrams respectively for explaining the adhering position of ink drops and size of a dot during the mixed color representation according to the conventional printing method (already referred to)

Conventionally, in the case where color printing is to be effected with the use of an ink-jet printing apparatus as referred to above, it is so arranged that, for a single color display or representation by either one of yellow, magenta, cyan or black, ink particles or drops in an amount equivalent to one dot are discharged onto one dot position for adhesion thereto as shown by hatched lines in FIG. 11(a), while, for a mixed color display or representation, ink drops in different colors are continuously caused to adhere onto the same dot position each by an amount equivalent to one dot as shown by intersecting hatched lines in FIG. 12(a).

Figure 13:
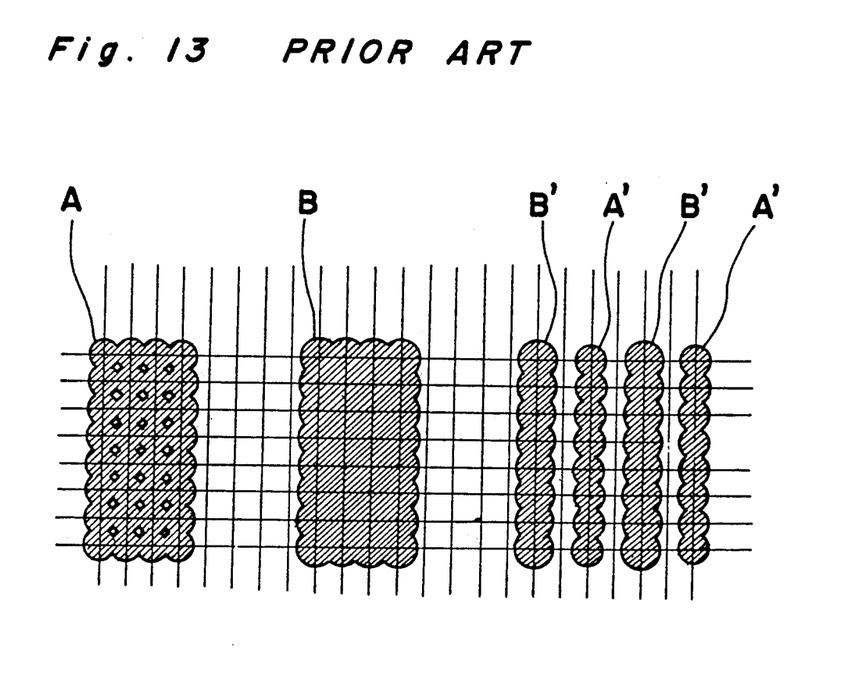
FIG. 13 is a diagram for explaining sizes of dots during solid printing and vertical line printing based on the mixed color representation and single color representation according to the conventional printing method (already referred to)
Figure 14A:
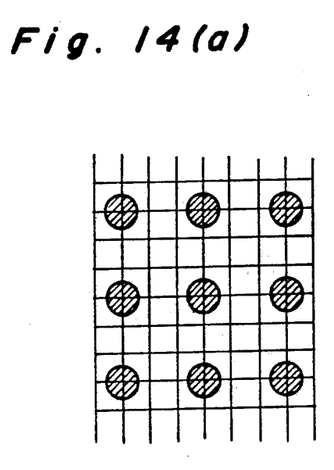
FIGS. 14(a), 14(b), 14(c), 14(d), 14(e), 14(f), 14(g), 14(h) and 14(i) are diagrams respectively for explaining dot disposition in the case of gradation degrees of 1 to 9 according to the conventional printing method.
Figure 14B:
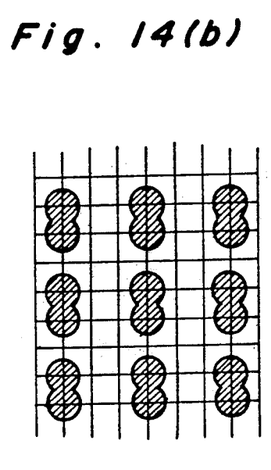
Figure 14C:
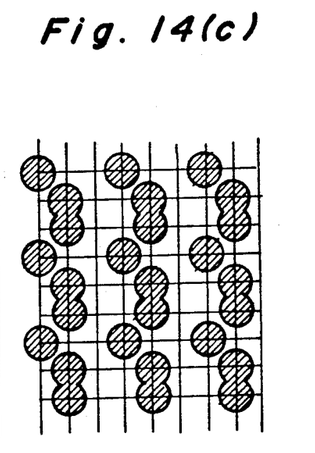
Figure 14D:
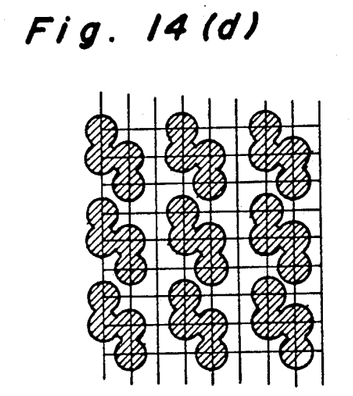
Figures 14E, 14F:
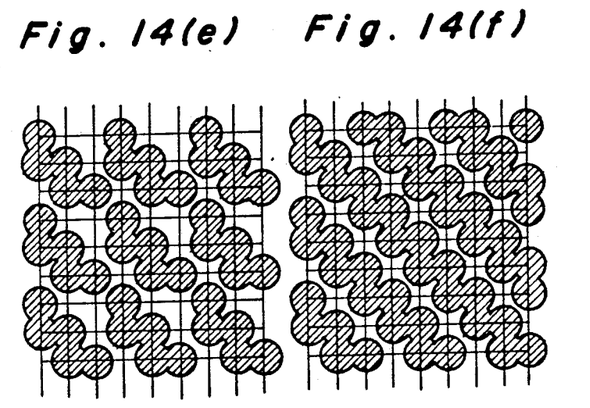
Figure 14G:
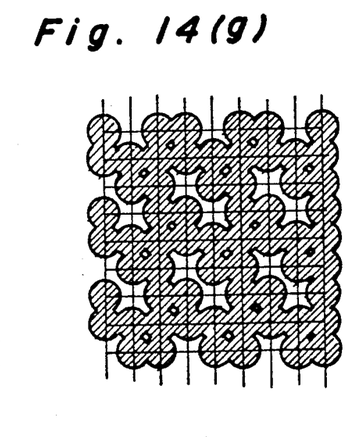
Figure 14H:
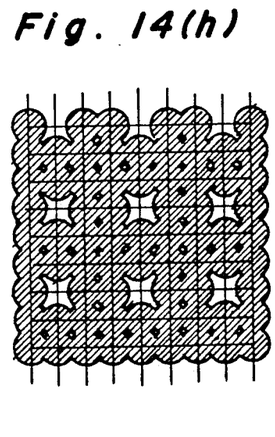
Figure 14I:
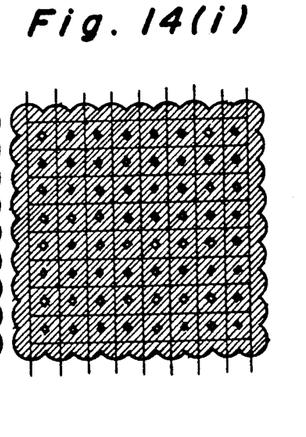
Figure 15A:
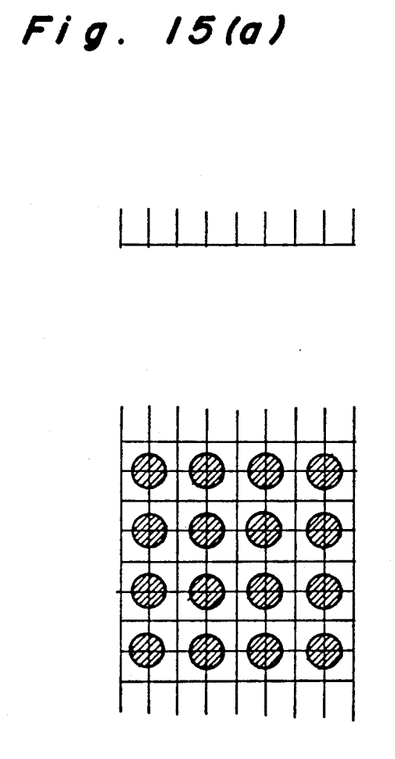
FIGS. 15(a), 15(b), 15(c) and 15(d) are diagrams respectively for explaining dot disposition in the case of gradation degrees of 1 to 4 according to the conventional printing method (already referred to)
Figure 15B:
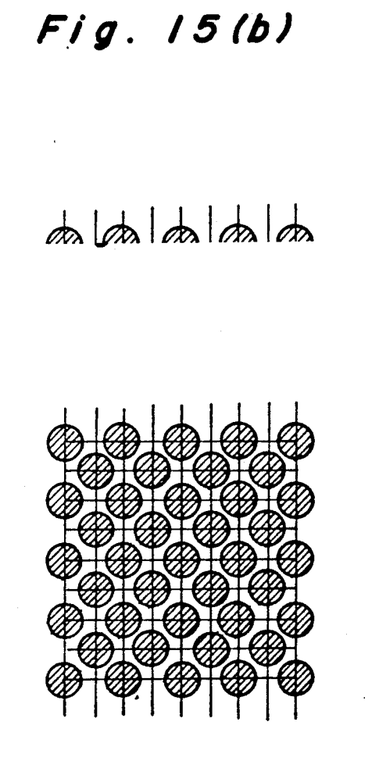
Figure 15C:
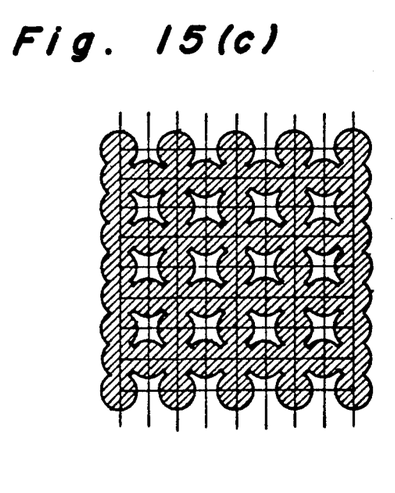
Figure 15D:
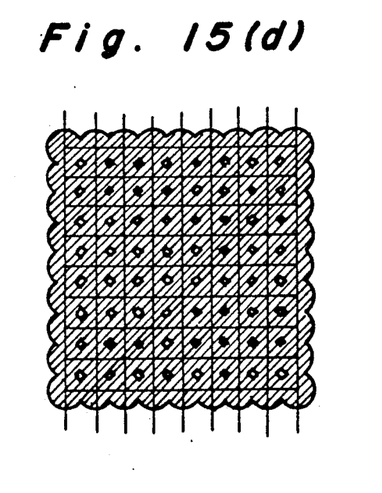

A conventional ink-jet printing apparatus is adapted to effect printing by causing the ink drops discharged from its nozzle to fly onto the surface of printing paper, and therefore, the size of one dot to be displayed on the printing paper is determined by the amount of ink in the drops thus discharged. Accordingly, the amount of ink to be discharged from the nozzle is set to such a predetermined amount as will not show any gaps between dots when a solid printing is performed. Therefore, in the case of the mixed color display, ink drops in different colors are discharged onto the same dot position each by the amount equivalent to one dot, resulting in adhesion thereto of an ink amount equivalent to two dots. Thus, as shown in FIG. 12(b), more ink is soaked into the printing paper to show a larger dot display as compared with a single color dot display in FIG. 11(b). With a difference in sizes of the dots as described above, when the solid printing is effected, the larger size of the display area for the mixed color display B becomes conspicuous as compared with the size of the display area for the single color display A, and in the printing of vertical lines also, the mixed color displays B' thick in comparison with the single color displays A' as shown in FIG. 13. Accordingly, there has been such a disadvantage that the resultant color print is very unnatural due to the difference between the single color display and the mixed color display as described so far.

Meanwhile, with respect to conventional methods of representing gradations in the ink-jet printing apparatus, as illustrated in FIGS. 15(a), 15(b), 15(c) and 15(d) showing four gradations, and also in FIGS. 14(a), 14(b), 14(c), 14(d), 14(e), 14(f), 14(g), 14(h) and 14(i), there are available an area gradation representing method (1) in which the number of dots per unit area is adapted to be variable according to the degrees of gradations, and another method (2) employed for an on-demand type printer, etc. and so arranged that, by controlling a driving voltage for the ink discharging or width of pulses according to the gradations, with the number of dots held constant, the size of the dot is varied to correspond to the gradation through variation of the amount of ink for one dot.

However, in the above method (1), if it is intended to suppress the dot density to be the same degree as in the case of a non-gradation, the numbers of dots in the longitudinal direction and vertical direction must be doubled respectively for the four gradations, and in this case, in order to print the same area as compared with that during the non-gradation over the same period of time, it is necessary double the running speed of a head, and also to increase the ink discharge driving frequency by a factor of four. Although it is possible to increase the driving frequency by a factor of four, there are various problems related to the doubling of the head running speed, such as a violent movement of ink within an ink tank, an increased size of the head driving motor, etc. Furthermore, as is seen from FIGS. 14 and 15, due to non-uniformity in the distribution of dots, the gradation linearity can not be regarded as favorable, resulting in an unnatural representation of gradations.

Figure 16:
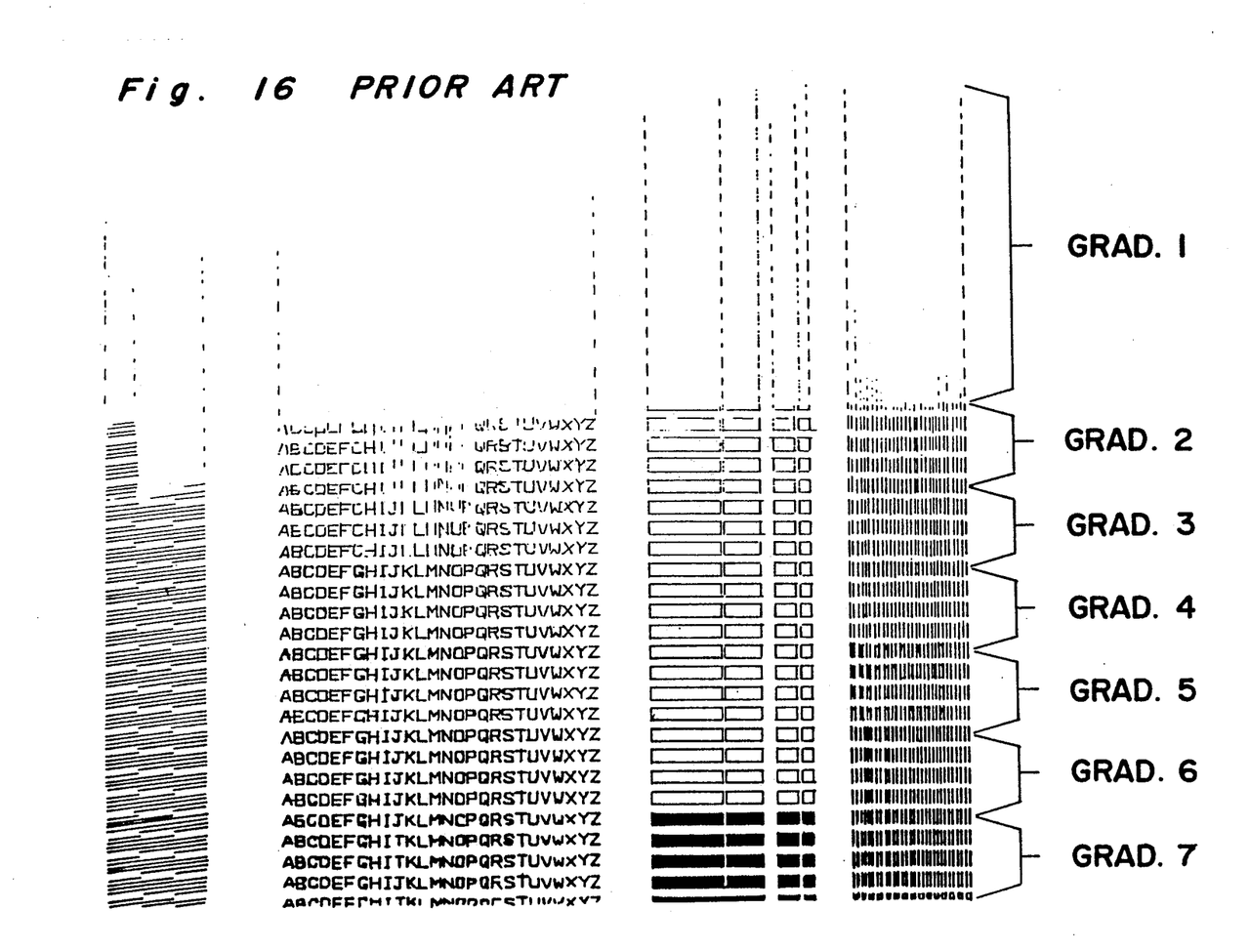
FIG. 16 is a reference diagram showing gradation representation in the prior art printing method.

Meanwhile, according to the above conventional method (2), although the gradation linearity is better than in method (1), there are problems with respect to the performance of the nozzle, discharged ink particles, and stability of the nozzle in functioning, owing to the fact that the amount of ink continuously discharged from the nozzle is increased per one jetting as the degree of gradation increases, with a simultaneous prolongation of the ink discharging time, and thus, method (2) has not been put into actual application as yet, since there is a limit to the gradation representation in multi-stages (FIG. 16).

SUMMARY OF THE INVENTION

Accordingly, an essential object of the present invention is to provide an ink jet printer material with printing colored printed on printing paper, in which the amount of ink for one dot of a single color representation and mixed color representation are equal to each other so as to provide dots of generally the same size for both representations, thus presenting very beautiful color printing through a natural combination of the single color and mixed color.

Another important object of the present invention is to provide a method an apparatus for representing gradations of printed material with an ink-jet printing apparatus, in which dots are adapted to have sizes corresponding to gradations so as to make the number of dots per unit area and disposition thereof constant, with an extremely favorable gradation linearity.

In accomplishing these and other objects of the present invention, according to one preferred embodiment of the present invention, there is provided an ink-jet printer for printing colored printed matter on printing paper arranged to effect printing by causing ink drops to fly onto printing paper through control by printing signals. The ink-jet printer sets a predetermined amount of an ink drop to be discharged from a nozzle, to be ½ of a proper ink amount per one dot, causing two drops of the same color ink to be discharged during single color representation. An ink discharge driving signal continuously outputting two ink discharge signals for one dot, each signal causing the predetermined amount of ink to be discharged from the nozzle, and also causing each one drop of ink in different colors to be discharged onto the same dot printing position during mixed color representation, so as to effect printing of one uniformly sized dot.

In another aspect of the present invention, there is provided a method of representing gradations of printed matter in an ink-jet printing apparatus arranged to effect printing by causing ink drops to fly onto printing paper through control by printing signals. The gradation representing method includes the steps of controlling discharge of ink drops from a nozzle by an ink discharge driving signal for continuously outputting ink discharge signals which cause a predetermined amount of ink drops within a range of a proper amount to be discharged from the nozzle by the number corresponding to a degree of gradation, and thus, allowing an amount of ink corresponding to the degree of gradation to be discharged onto a predetermined dot position.

By the steps according to the present invention as described above, improved methods of printing colored printed matter have been advantageously presented, with substantial elimination of disadvantages inherent in the conventional printing methods of this kind.

BRIEF DESCRIPTION OF THE DRAWINGS

These and other objects and features of the present invention will become apparent from the following description taken in conjunction with the preferred embodiments thereof with reference to the accompanying drawings, in which:

FIGS. 8(a), 81b), 8(c) and 8(d) are diagrams for showing sizes of the dots respectively in FIGS. 7(a) through 7(d);

DETAILED DESCRIPTION OF THE INVENTION

Before the description of the present invention proceeds, it is to be noted that like parts are designated by like reference numerals throughout the accompanying drawings.

Figure 2:
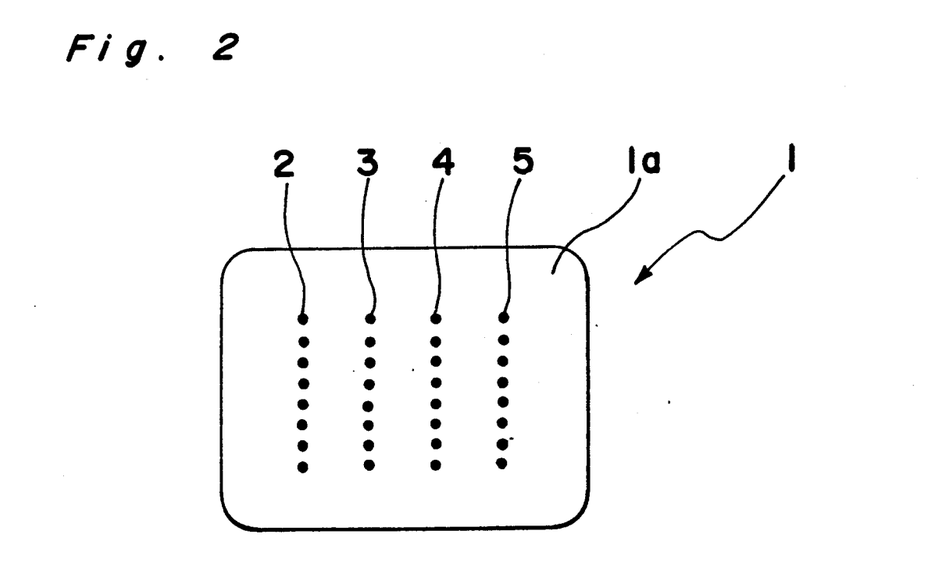
FIG. 2 is a schematic top plan view of a nozzle employed in the printing apparatus of FIG. 1.

Referring now to the drawings, there is shown in FIG. 2, a discharge face 1a of a nozzle 1 for an ink-jet printing apparatus to be employed for effecting a printing method of the present invention.

Figure 1:
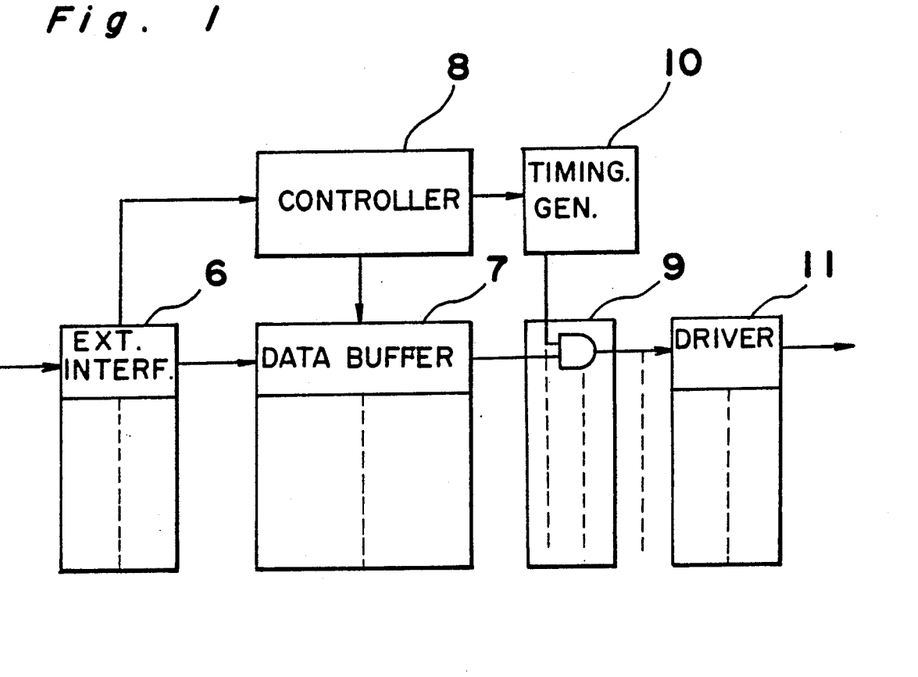
FIG. 1 is a block diagram of an ink jet printing apparatus for effecting the printing method according to the present invention.

In the discharge face 1a of the nozzle 1 in FIG. 1, there are formed, from the left side towards the right side, a first row of discharge holes 2 for yellow, a second row of discharge holes 3 for magenta, a third row of discharge holes 4 for cyan, and a fourth row of discharge holes 5 for black, each row including eight holes vertically arranged as illustrated. Each of these discharge holes 2 to 5 has such a diameter as will render an ink discharge amount by one driving, to be ½ of a proper discharge amount per dot in conventional practice.

Reference is further made to FIG. 1 showing one example of a circuit construction of an ink-jet printing apparatus which may be employed for effecting the printing method according to the present invention.

In FIG. 1, the circuit generally includes a data buffer 7, an external interface 6 connected to the data buffer 7 and also to a controller 8 which is coupled to the data buffer 7 and a timing generator 10, a gate circuit 9 connected to the data buffer 7 and the timing generator 10, and further coupled to an ink discharge driving circuit 11. In this circuit arrangement, printing data signals from a host computer (not shown) are successively taken into the data buffer 7 through the external interface 6, and in this data buffer 7, color printing data, for example, for one page, are temporarily stored. These printing data signals as controlled by the controller 8 are successively outputted from the data buffer 7, while from the gate circuit 9, ink discharge signals based on the printing data signal are outputted through clock signals emitted from the timing generator 10, and thus, ink drops of predetermined colors are discharged from the nozzle 1 by the ink discharge driving circuit 11.

Figures 3A, 3B, 3C:
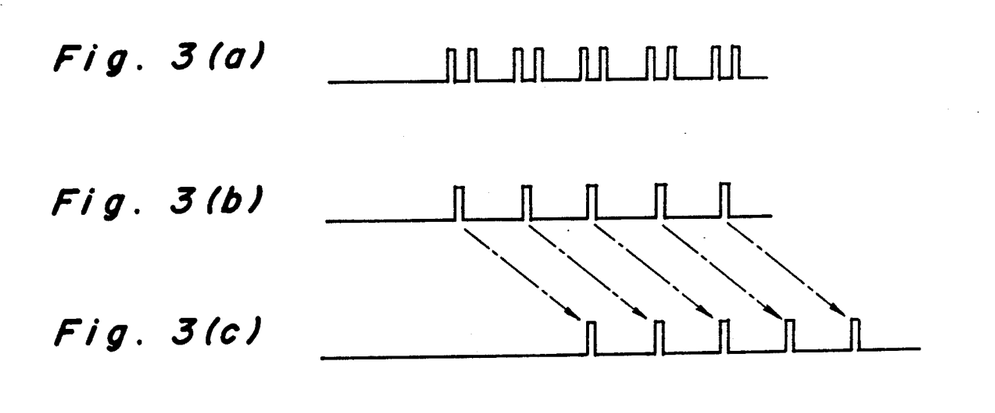
FIG. 3(a) is a waveform diagram of an ink discharge driving signal during single color representation in the printing apparatus of FIG. 1.
FIGS. 3(b) and 3(c) are waveform diagrams of ink discharge driving signals during mixed color representation in the printing apparatus of FIG. 1.
Figures 4A, 4B:
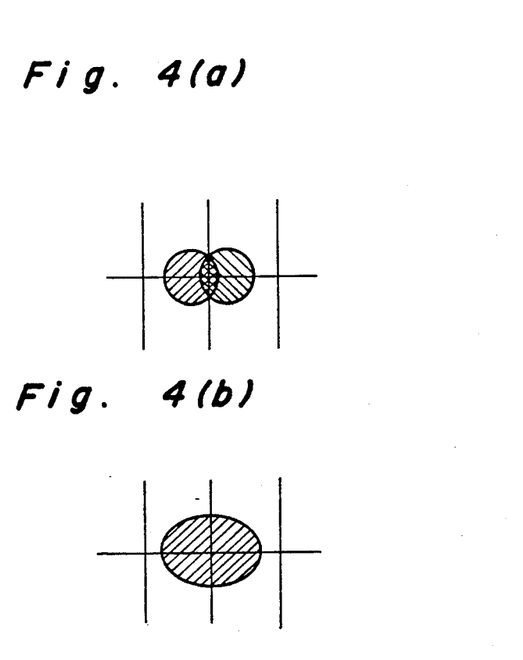
FIGS. 4(a) and 4(b) are diagrams respectively for explaining the adhering position of ink drops and size of a dot during the single color representation according to the printing method of the present invention.

More specifically, in the case of the single color representation, by the ink discharge driving signal which continuously outputs two ink discharge signals per one dot as shown in FIG. 3(a), an ink drop in an amount equivalent to half of the proper amount is caused to continuously adhere twice onto the same position with a slight positional deviation therebetween as illustrated in hatched lines in FIG. 4(a), and forms a somewhat elliptic shape as in FIG. 4(b), but as a result, presents a dot representation With the proper amount of ink.

Figures 5A, 5B:
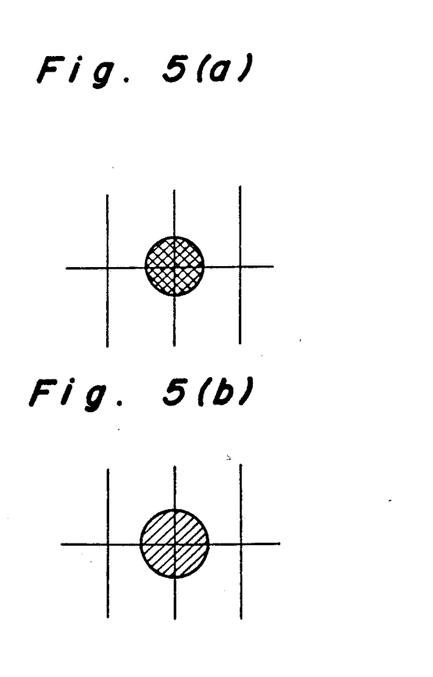
FIGS. 5(a) and 5(b) are diagrams respectively for explaining the adhering position of ink drops and size of a dot during the mixed color representation according to the printing method of the present invention.

Meanwhile, in the case of the mixed color representation, since the discharge holes 2 to 5 of the nozzle 1 are laterally arranged in rows through classification according to the colors of ink to be discharged as described earlier with reference to FIG. 1, it is necessary to delay the ink discharge by a time required for displacement of a head in the lateral direction, in order to cause the ink drops to adhere to the same dot position. Accordingly, as shown in FIGS. 3(b) and 3(c), by the ink discharge driving signal by which two ink discharge signals are outputted per dot by a time delay corresponding to the interval of the discharge holes 2 to 5 in the ink colors to be mixed, two kinds of ink drops to be mixed in colors are caused to continuously adhere to the one dot position as shown in FIG. 5(a) by crossing hatched lines, so as to be expanded after adhesion through soaking into the printing paper, thus forming a dot as illustrated in FIG. 5(b). In the case of the mixed color representation as described above, since the amount of ink per dot is equal to that in the single color representation, there is hardly any difference in the sizes of the displayed dots as is clear from the comparison between FIG. 4(b) and FIG. 5(b).

Figure 6:
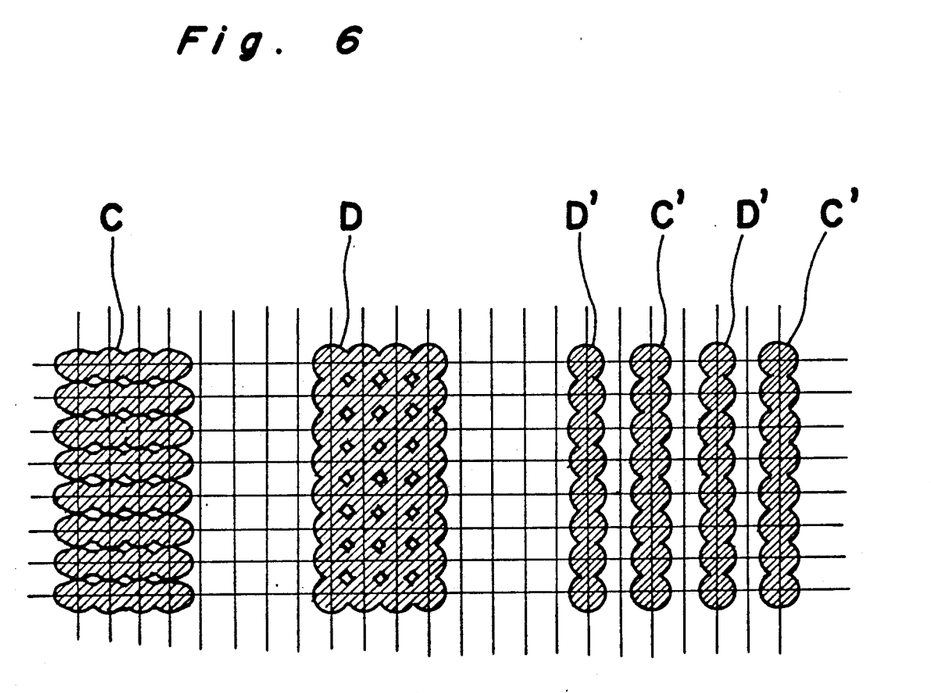
FIG. 6 is a diagram for explaining sizes of dots during solid printing and vertical line printing based on the mixed color representation and single color representation according to the printing method of the present invention.
Figure 7A:
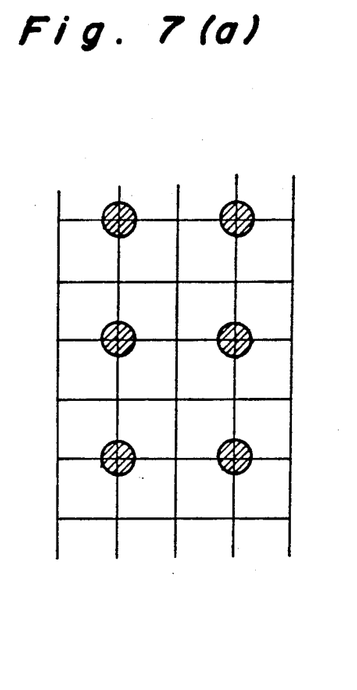
FIGS. 7(a), 7(b), 7(c) and 7(d) are diagrams respectively for explaining adhering positions of ink drops at gradation degrees of 1 to 4 according to one preferred embodiment of a gradation representing method of the present invention.
Figure 7B:
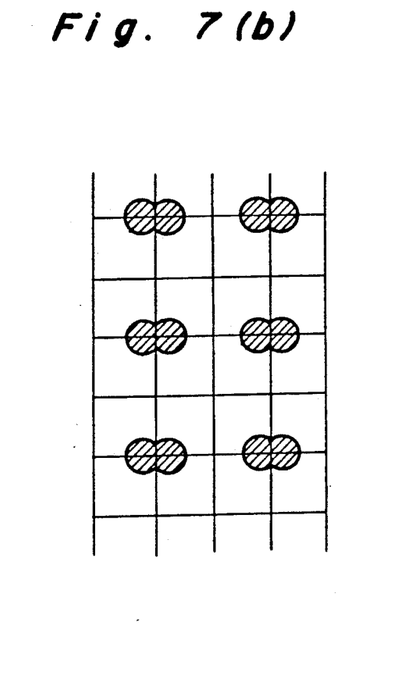
Figure 7C:
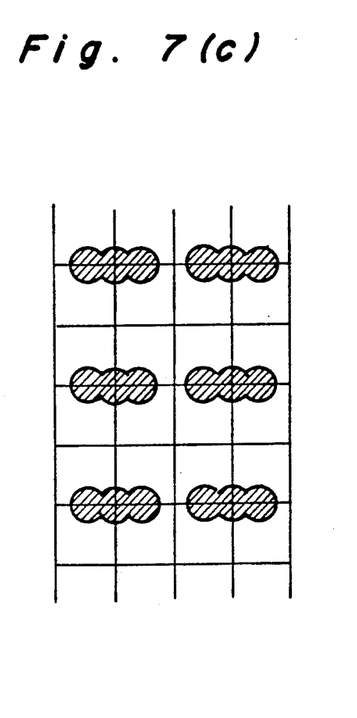
Figure 7D:
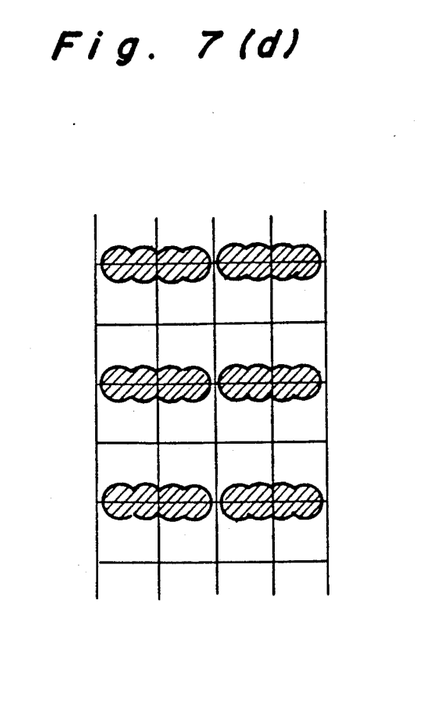
Figure 8A:
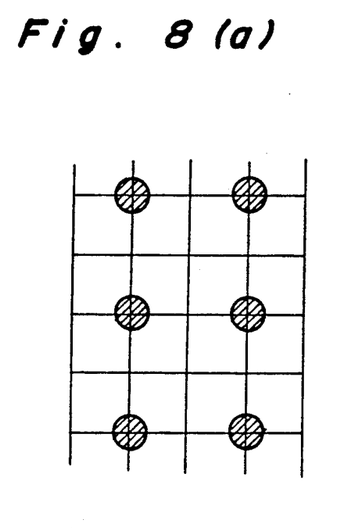
Figure 8B:
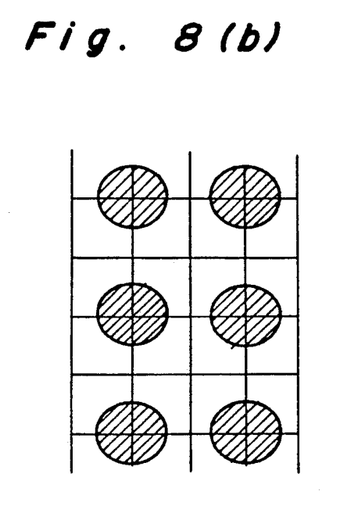
Figure 8C:
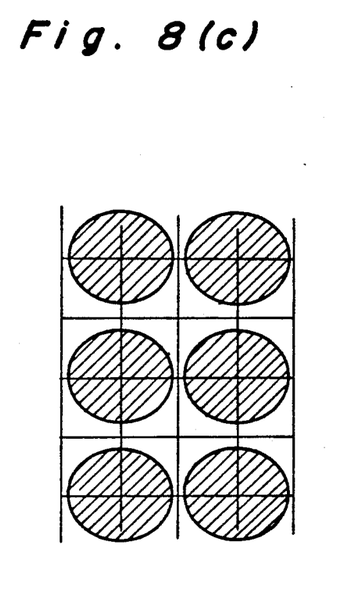
Figure 8D:
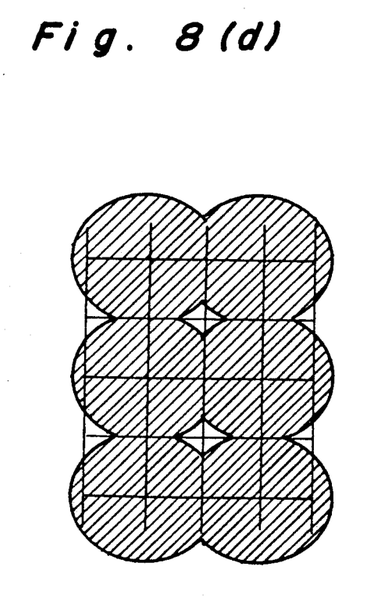

By the above fact, as shown in FIG. 6, sizes of the displayed areas for the single color representation C and the mixed color representation D when the solid printing is effected, become approximately the same, and further, even in the case where printing for the vertical lines is effected, both displays C' and D' for the single color and mixed color representations are shown in approximately the same thickness.

With respect to the point referred to earlier that one dot takes the elliptic shape as shown in FIG. 4(b) in the case of the single color representation, it may be so arranged to reduce the time for the ink discharge through improvement of frequency characteristics of the nozzle 1, and thus, the dot becomes approximately circular in shape to eliminate the difference from the case of mixed color representation.

As is seen from the foregoing description, according to the printing method of colored printed matter of the present invention, since the amount of ink to be discharged from the nozzle is set to be ½ of a proper ink amount per one dot, and during the single color representation, two drops of the same color ink are caused to be discharged per one dot, while in the case of the mixed color representation, each one drop of the different colored ink is discharged onto the same dot printing position, the ink amounts per dot for the single color representation and the mixed color representation become generally equal to each other so as to provide the dots of approximately the same size for both of the displays, and thus, very beautiful color printing in which the single color and mixed color are naturally combined may be effected.

Referring further to FIGS. 7 through 10, a method of representing gradations of printed matters according to a second embodiment of the present invention will be described hereinbelow.

In FIGS. 7(a) to 7(d), there are shown adhering positions for ink drops respectively in the case where degrees of gradation are 1 to 4. As is seen from these figures, the same amounts of ink drops within a proper range for stably discharging such ink drops are continuously discharged from the nozzle at a repeating frequency for the stable discharge by the number of times corresponding to the degrees of gradation. In other words, the amounts of ink corresponding to the degrees of gradation are discharged in a state equally divided into the number of times corresponding to the degrees of gradation. In the above case, although the ink adhering positions per unit area are set to be constant (six spots in this embodiment), the ink drops continuously discharged are caused to adhere with a slight positional deviation by the movement of the head in a printing direction (i.e. in a lateral direction).

The ink drops adhering to the printing paper as in FIGS. 7 (a) to 7(d) are expanded as they are soaked into the paper, thus forming dots having sizes corresponding to the amounts of the adhering ink as shown in FIGS. 8(a) to 8(d). In other words, dots with sizes corresponding to the degrees of gradation 1 to 4 are formed. Accordingly, favorable approximately equal to the conventional method (2) referred to earlier can be obtained to provide a natural gradation representation. Since the amount of ink drop discharge per one time may be generally equal, for example, to that in the conventional method (1) described earlier, there are no problems related to the nozzle and stability of ink drops, and thus, representation in multi-gradations may be readily achieved.

Figure 9:
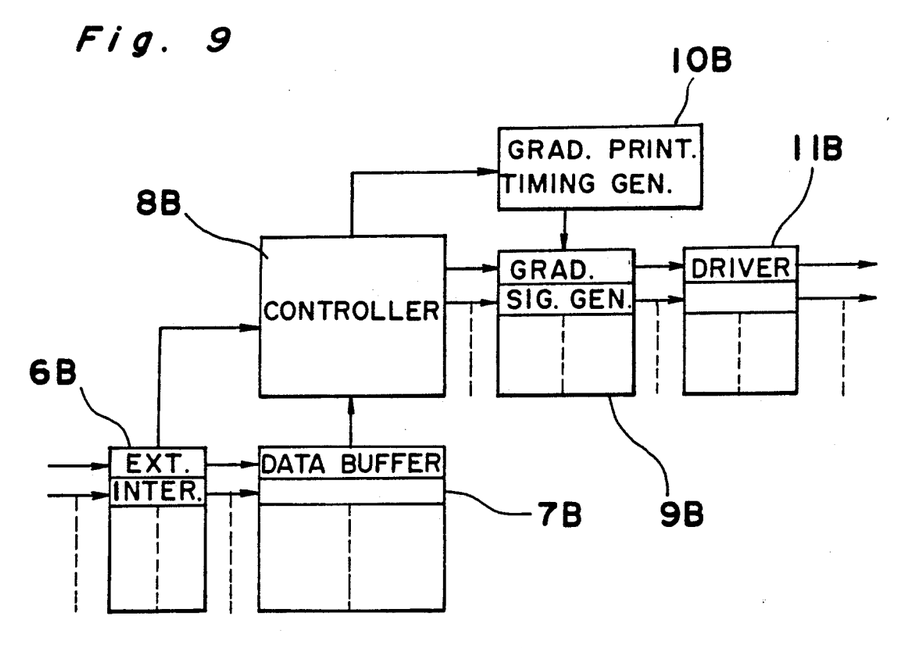
FIG. 9 is a block diagram of an ink jet printing apparatus for effecting the gradation representing method according to the present invention.
Figure 10A:
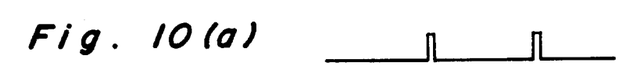
FIGS. 10(a), 10(b), 10(c) and 10(d) are respectively waveform diagrams of output signals at gradation degrees of 1 to 4 in the printing apparatus of FIG. 9.
Figure 10B:
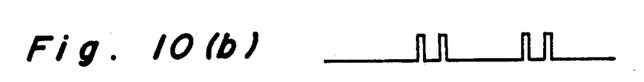
Figure 10C:
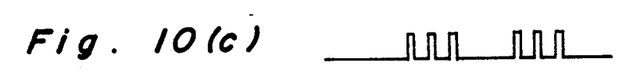
Figure 10D:
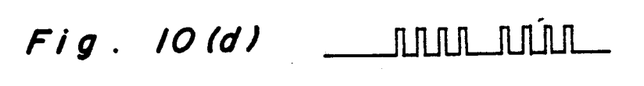

In FIG. 9, there is shown a modified circuit arrangement for an ink-jet printing apparatus which may be used for effecting the above gradation representing method of the present invention.

The circuit as shown in FIG. 9 generally includes a data buffer 7B, an external interface 6B connected to the data buffer 7B and also to a controller 8B which is coupled to the data buffer 7B and a gradation print timing generator 10B, a gradation signal generator 9B connected to the data buffer 7B and also to an ink discharge driving circuit 11B as shown. By the above arrangement, printing data signals from a host computer (not shown) are sequentially taken into the data buffer 7B through the external interface 6B, and in this data buffer 7B, color printing data, for example, for one page are temporarily stored as described earlier with reference to FIG. 1. Based on these printing data, the controller 8B is driven so as to control the gradation signal generator 9B and the gradation print timing generator 10B in synchronization with the movement of the head. Meanwhile, from the gradation signal generator 9B, ink discharge signals based on the control signals of the controller 8B are outputted by the clock signals from the timing generator 10B, and formed into signals for discharging ink drops from the nozzle by the ink discharge driving circuit 11B for discharging ink by driving the nozzle. More specifically, in the respective cases for the degrees of gradation 1, 2, 3 and 4, by the ink discharge driving signals for continuously outputting the ink discharge signals corresponding in number to the gradation degrees as shown respectively in FIGS. 10(a), 10(b), 10(c) and 10(d), ink drops are discharged from the nozzle through application of a high voltage to the nozzle.

As is seen from the foregoing description, in the method of representing gradations of printed matter through employment of the ink-jet printing apparatus according to the present invention, since it is so arranged that the ink amount is equally divided to correspond to the degrees of gradation so as to continuously discharge the predetermined amount of ink drop by the number of times corresponding to the gradation degrees, thereby forming the dots into sizes corresponding to the gradation by the soaking of the ink into the printing paper, it becomes possible to make constant the number of dots per unit area and disposition thereof. There is no necessity for increasing the running speed of the head as the dot density is not increased, thus eliminating such problems as movement of ink in the ink tank, large size of the driving motor, etc. Moreover, since the number of dots and disposition thereof are constant, the gradation linearity becomes extremely favorable. Furthermore, owing to the arrangement that the amount of ink corresponding to the degree of gradation and equally divided, is caused to be continuously discharged several times, the ink amount discharged from the nozzle becomes constant even in the representation in multi-gradations, and thus, stability of the nozzle and the discharged ink drops can be achieved, thereby making it possible to readily effect representation in multi-gradations.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An ink jet printer for forming colored printed matter on printing paper comprising:
   an ink jet nozzle provided in connection with said ink jet printer;
   a plurality of discharge holes formed in a discharge face of said ink jet nozzle, each of said plurality of discharge holes having a reduced diameter orifice whose maximum ink emission amount will discharge an ink drop equal to one-half of a total print dot size to appear on said printing paper and said plurality of discharge holes being equally divided into a plurality of vertical rows, each vertical row corresponding to one ink color;
   means for introducing print data into said ink jet printer;
   means for temporarily storing said print data introduced into said ink jet printer, said print data being stored as print signals;
   control means for controlling an output of said print signals from said means for temporarily storing at predetermined timings; and
   a discharge driving circuit, responsive to said control means, for generating a discharge driving signal which outputs two ink discharge signals for each said total print dot;
   said ink jet nozzle being responsive to said discharge driving circuit for discharging two ink drops of said maximum ink emission amounts from said ink jet nozzle onto the same paper position to form said total print dot, said ink jet nozzle discharging two ink drops each of a maximum ink emission amount from one vertical row for a single color representation and discharging one ink drop each of a maximum ink emission amount from two different vertical rows for a mixed color representation;
   said ink drops being discharged onto the same paper position with a slight positional deviation of said ink drops to form an elliptical print dot on said printing paper.

* * * * *